W. E. TRUFANT.
FRICTION SPEED GEAR FOR AUTOMOBILES.
APPLICATION FILED FEB. 23, 1906.
1,048,235.
Patented Dec. 24, 1912.
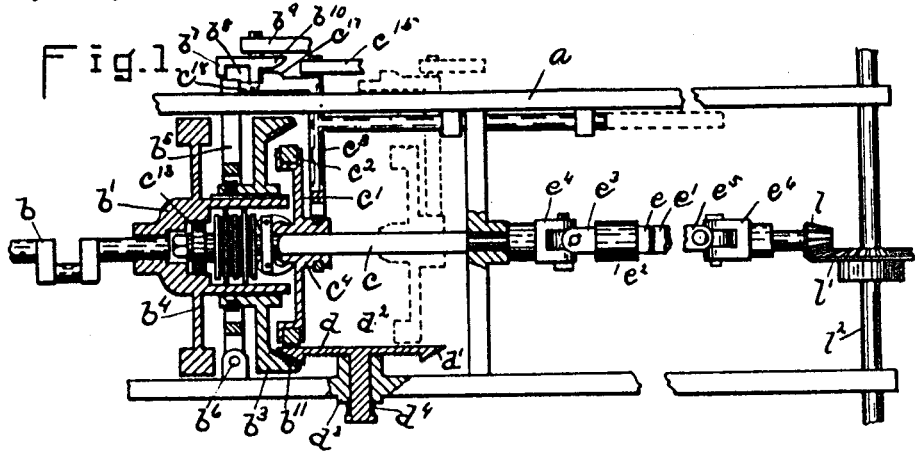
Fig. 1
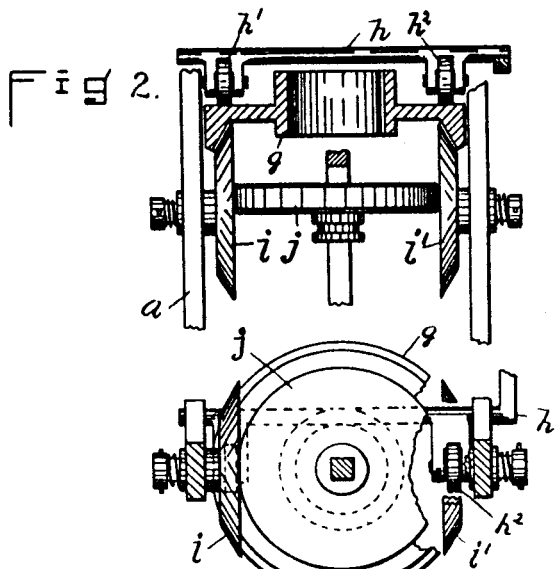
Fig. 2.
Fig. 3.
WITNESSES.
INVENTOR.
W. E. Trufant.

UNITED STATES PATENT OFFICE.

WALTER E. TRUFANT, OF WHITMAN, MASSACHUSETTS.

FRICTION SPEED-GEAR FOR AUTOMOBILES.

1,048,235.     Specification of Letters Patent.     Patented Dec. 24, 1912.

Application filed February 23, 1906. Serial No. 302,330.

*To all whom it may concern:*

Be it known that I, WALTER E. TRUFANT, of Whitman, in the county of Plymouth and State of Massachusetts, have invented certain new and useful Improvements in Friction Speed-Gear for Automobiles, of which the following is a specification.

This invention relates to speed changing and power transmitting gearing for automobiles, and in many features is intended as an improvement over patent for friction-drive speed-gear, No. 805,504, dated Nov. 28, 1905, granted to me; and consists in such form and arrangement of the friction disks as to relieve their journals from excessive thrust strains and be easily operated, and in various other features which will be hereinafter described and particularly pointed out in the claims.
In the embodiment of my invention shown in the accompanying drawings forming a part of this specification, Figure 1 shows a plan, largely in section, of my invention applied to the regular style of automobile, and Fig. 2 shows gearing having a transmitting disk on opposite sides of the roll and driving shaft, and Fig. 3 is another view of the same.

In Fig. 1 $a$ represents the frame of the machine and $b$ the engine shaft which may be supplied with power from any suitable source. On the engine shaft is keyed the hub or clutch case $b^1$; this hub is practically an enlargement of the engine or power shaft and carries the balance wheel $b^4$ and also the power transmitting friction wheel $b^3$ made to slide freely axially on the hub. The friction wheel is slid on the hub by means of the lever $b^5$ pivoted at $b^6$, and the end of this lever is normally in the notch $b^8$ in the shifter $b^7$. This shifter is operated by the hand bar $b^9$. The power delivering surface of the friction wheel may be faced with leather or other friction material as shown at $b^{11}$. The hub $b^1$ is splined out on opposite sides internally to take the projecting ears on the alternate clutch disks and is recessed to fit loosely the bearing case $c^{14}$. The transmitting friction disk $d$ is journaled to the frame at $d^3$ with its power delivering surface parallel with the shaft $c$ and its beveled power receiving surface parallel with the friction surface of the wheel $b^3$. The disk $d$ is normally held against the journal box $d^3$ and out of contact with all friction surfaces by the helical spring $d^4$. Power is applied to the disk $d$ by the friction wheel $b^3$ and transmitted by the disk to the roll $c^1$, which is provided with the friction rim $c^2$, to the driving shaft $c$. Power is transmitted from the shaft $c$ through the universal joints $e^3$ $e^4$, propeller shaft $e$ $e^1$, joints $e^5$ $e^6$, bevel gears $l^1$ to the shaft or axle $l^2$. This shaft $l^2$ may be either a countershaft for chain drive or the vehicle axle itself. Propeller shafts which run to the axle must be provided with a slip joint to permit the action of the springs of the vehicle, and it is desirable to have some torsional flexibility between the engine and the road wheels for if one or both wheels are suddenly accelerated or retarded by the vehicle passing over rough surfaces the strains set up are very great and result in broken engine shafts and stripped gears. I provide against these shaft strains by making the propeller shaft flexible so that all of the strains are taken up without danger to the other parts of the transmission. The propeller shaft is made of one or more flat, wide strips or bars $e$ $e^1$, which may be of metal, wood or other material. These are fitted loosely in the slots in the back end $e^3$ of the fork of the universal joint and are held in place by the collar $e^2$. This makes a cheap connection and a good slip joint, and in case of breakage of the propeller bars a new one may be put in by simply slipping off the collar and sliding in the new bar and replacing the collar.

In operation while the vehicle is standing the disk clutch is released, so when the engine is started the only parts rotated will be the hub $b^1$ with the friction wheel $b^3$ and the clutch disks. The roll $c^1$ is then slid by means of the bar $c^{16}$ and shipper $c^5$, a T shaped piece sliding in lugs in the side of the frame and imparting the movement of the bar $c^{16}$ to the roll $c^2$, to a position, as shown in Fig. 2, just forward of the center of the disk $d$ and the shifter $b^7$ is then moved by the notched piece $b^{10}$ so that the lever $b^5$ is held in the notch $b^8$ when the friction wheel $b^3$ is slid on its keyway against the beveled face of the disk $d$ which then revolves at the same surface speed as the wheel. A further movement of the wheel $b^3$ carries in the disk $d$, against the action of the spring $d^4$, and forces it against the periphery of the roll $c^1$ which will revolve at the same surface speed as the part of the disk with which it is in contact. This gives the slowest forward speed. The roll may then be moved forward along the face of the disk increasing the speed as it approaches the edge of the disk. It will be noticed that as the friction wheel $b^3$ is pressed against the disk $d$ the disk is automatically raised into contact with the roll $c$ by the wedge shaped arrangement of the surfaces and if there is slippage between any of the friction surfaces further pressure on the wheel by the shipper $b^6$ will automatically increase the pressure alike on all the surfaces. To get the reverse the roll is moved toward the rear edge of the disk as shown by the dotted lines in Fig. 1. As the roll approaches the forward edge of the disk the trip arm $c^{17}$ comes in contact with the shifter at $b^{10}$ and throws it out of engagement with the lever $b^5$ and the point $c^{18}$ pushes the lever along carrying the friction wheel out of contact with the disk $d$ which is drawn by the spring $d^4$ away from the roll $c^1$ and against the journal box $d^3$ when the disk comes to rest. The same movement which throws out the disk as just described brings the cone $c^4$ in contact with the clutch arms and thus clamps the clutch members together and all of the parts turn as one and the drive is direct with none of the friction drive surfaces in contact. In Fig. 1 the parts are all shown in direct drive position. It will be noticed that when the friction disk is driving the vehicle there is no thrust strain on the bearing $d^3$ and, owing to the angle of the contact surfaces almost none on the friction wheel and lever $b^5$.

Figs. 2 and 3 show a modification of the construction shown in Fig. 1 and said modification has two disks opposite each other which thus balance the strain on the bearings of all the frictional surfaces due to the force required to secure the proper driving contact, and gives a propelling force on opposite sides of the friction roll. In these figures $g$ is the friction wheel and $h$ a rock shaft carrying two rolls $h^1$ $h^2$ which bear on the back of the friction disk opposite the point where the contact is made with the friction disks and thus regulates the pressure on the beveled friction surfaces of the disks $i$ $i^1$ and on the roll $j$.

What I claim as new, and desire to secure by Letters Patent of the United States, is—

1. In an apparatus of the kind described the combination of, a power shaft, a wheel having a friction surface on said power shaft, a disk having two friction surfaces, one of said surfaces being adapted to be brought in contact with the friction surface on said wheel, a driving shaft, and a roll on said driving shaft, the said friction surfaces being shaped to automatically regulate the pressure on said surfaces when said wheel and disk are in contact.

2. In an apparatus of the kind described the combination of, a power shaft, a driving shaft, a clutch to connect said power shaft and said driving shaft, an internally beveled friction wheel on said power shaft, a beveled friction disk to receive power from said wheel, and a roll on said driving shaft to receive power from said disk.

3. In an apparatus of the kind described the combination of, a power shaft, a wheel having a friction surface on said power shaft, a disk having two friction surfaces, one of said surfaces being adapted to be brought in contact with the friction surface on said wheel, a driving shaft, and a roll on said driving shaft, the said friction surfaces being shaped to automatically regulate the pressure on said surfaces when said wheel and disk are in contact, and means to connect said power shaft and driving shaft together.

4. In an apparatus of the kind described the combination of, a power shaft, an inwardly beveled disk on said power shaft, a disk having an outwardly beveled surface and a flat surface, the outwardly beveled surface of said disk being adapted to be brought in contact with the beveled surface of said inwardly beveled disk, a driving shaft, and a roll on said driving shaft, the said friction surfaces being shaped to automatically regulate the pressure on said surfaces when said beveled surfaces are in contact.

In testimony whereof I have affixed my signature, in the presence of two witnesses.

WALTER E. TRUFANT.

Witnesses:
ROSANNA CALLANAN,
G. HOWARD SOULE.